(12) United States Patent
Kawano et al.

(10) Patent No.: US 7,903,514 B2
(45) Date of Patent: Mar. 8, 2011

(54) INFORMATION REPRODUCTION DEVICE

(75) Inventors: Eisaku Kawano, Saitama (JP);
Masahiro Kato, Saitama (JP); Masahiro Miura, Saitama (JP); Tohru Kanegae, Saitama (JP); Kyusho Omori, Saitama (JP); Tatsuhiro Yone, Saitama (JP)

(73) Assignee: Pioneer Corporation, Tokyo (JP)

( * ) Notice: Subject to any disclaimer, the term of this patent is extended or adjusted under 35 U.S.C. 154(b) by 412 days.

(21) Appl. No.: 12/093,369

(22) PCT Filed: Nov. 6, 2006

(86) PCT No.: PCT/JP2006/322114
§ 371 (c)(1),
(2), (4) Date: Jul. 9, 2008

(87) PCT Pub. No.: WO2007/055177
PCT Pub. Date: May 18, 2007

(65) Prior Publication Data
US 2009/0046551 A1 Feb. 19, 2009

(30) Foreign Application Priority Data
Nov. 10, 2005 (JP) ................................. 2005-325848

(51) Int. Cl.
*G11B 7/00* (2006.01)
(52) U.S. Cl. .................. 369/53.2; 369/44.36; 369/53.14
(58) Field of Classification Search .................. 369/53.2
See application file for complete search history.

(56) References Cited

U.S. PATENT DOCUMENTS

| 6,937,550 | B2 * | 8/2005 | Ohsawa | 369/53.14 |
| 2004/0170094 | A1 * | 9/2004 | Takehara | 369/44.36 |
| 2006/0239143 | A1 * | 10/2006 | Yamamoto et al. | 369/47.17 |

FOREIGN PATENT DOCUMENTS

| JP | 2000-182239 | 6/2000 |
| JP | 2002-123945 | 4/2002 |
| JP | 2002-319239 | 10/2002 |
| JP | 2002-329330 | 11/2002 |
| JP | 2002-329331 | 11/2002 |
| JP | 2003-046373 | 2/2003 |
| JP | 2006-302424 | 11/2006 |

* cited by examiner

*Primary Examiner* — Van N Chow
(74) *Attorney, Agent, or Firm* — Young & Thompson

(57) ABSTRACT

An information reproducing apparatus (1) is provided with: a detecting device (11) for irradiating an information. recording medium with laser light (LB) and detecting reflected light as a detection signal, the information recording medium including a first recording layer (L0) and a second recording layer (L1); a high pass filter (14) for performing a filtering process on the detected detection signal; and a reproducing device (15, 16) for performing a reproduction process of the filtered detection signal to reproduce the data, the high pass filter attenuates a fluctuation component of the detection signal, caused by a relative eccentricity between the first recording layer and the second recording layer, by a first attenuation amount (34dB) or more.

17 Claims, 13 Drawing Sheets

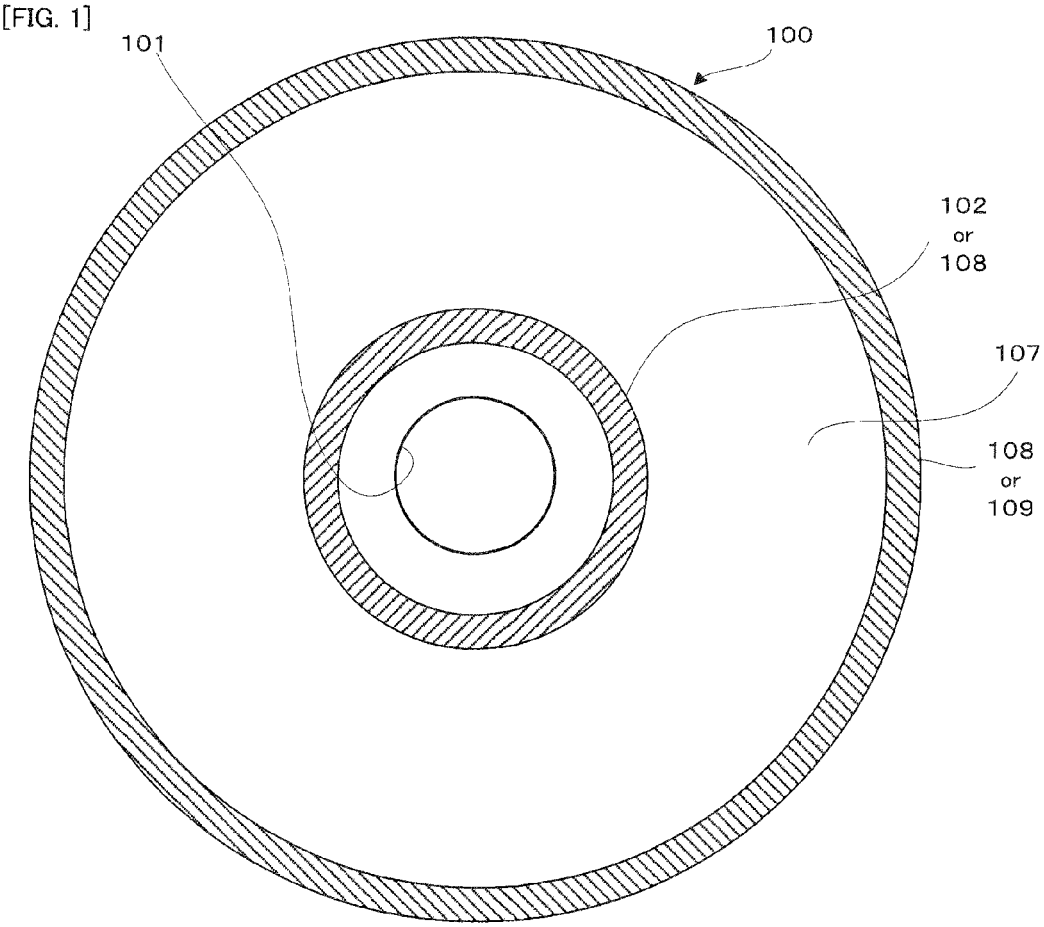
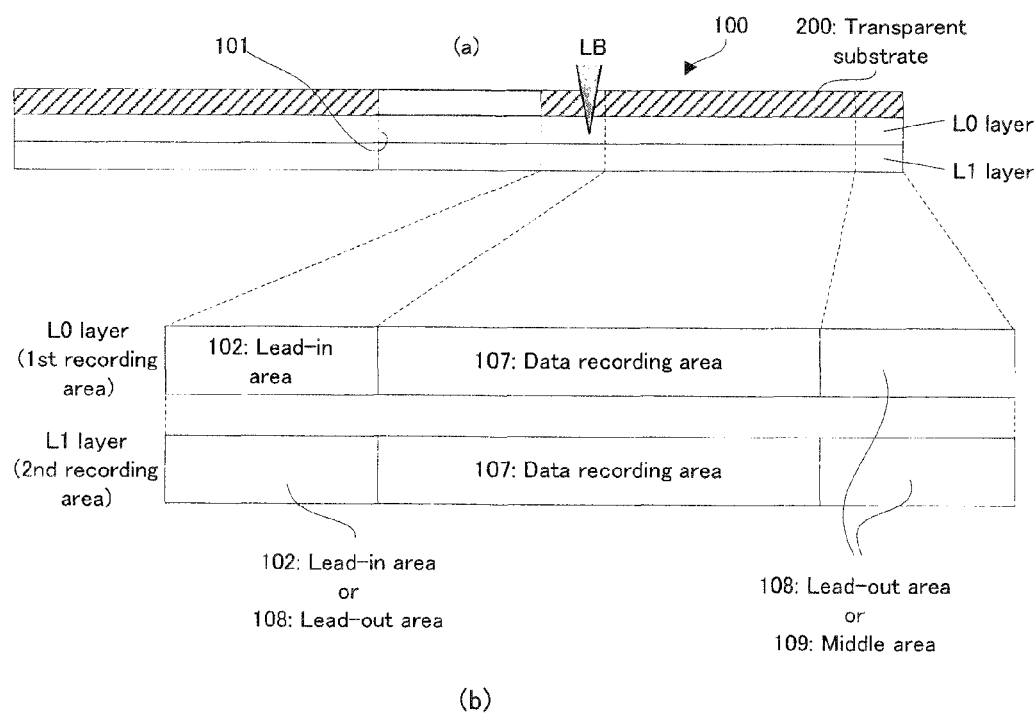

[FIG. 2]
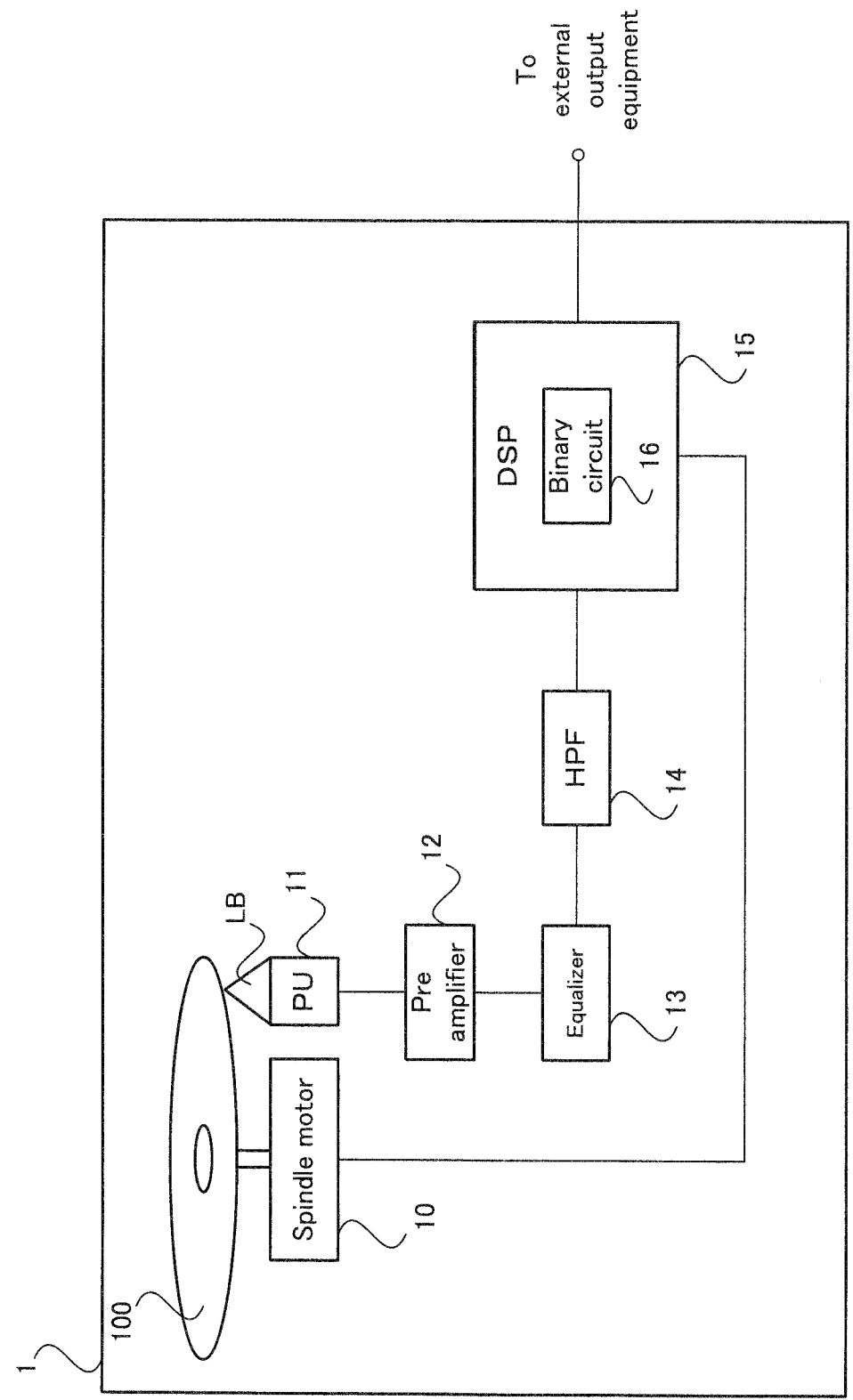

[FIG. 3]
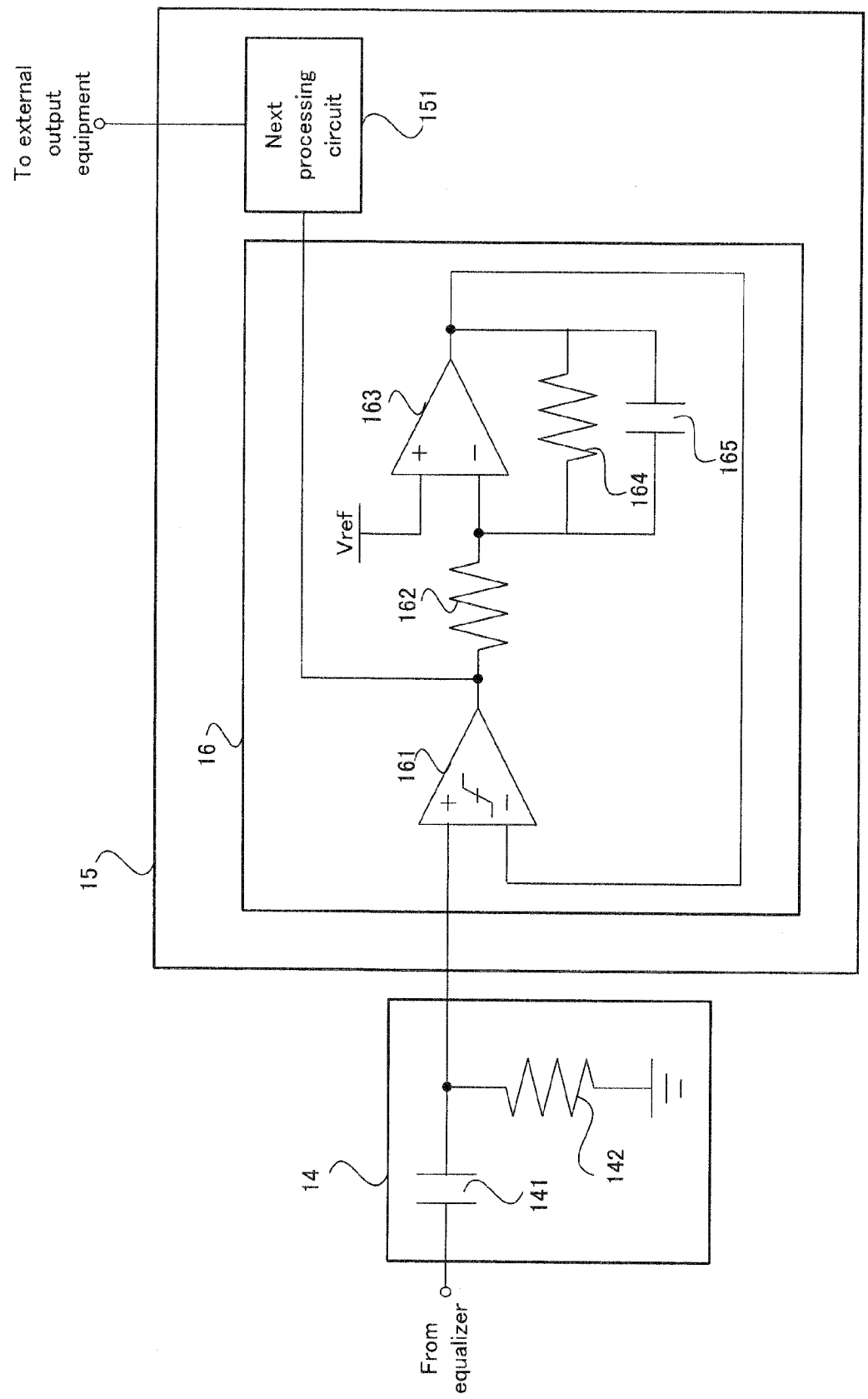

[FIG. 4]
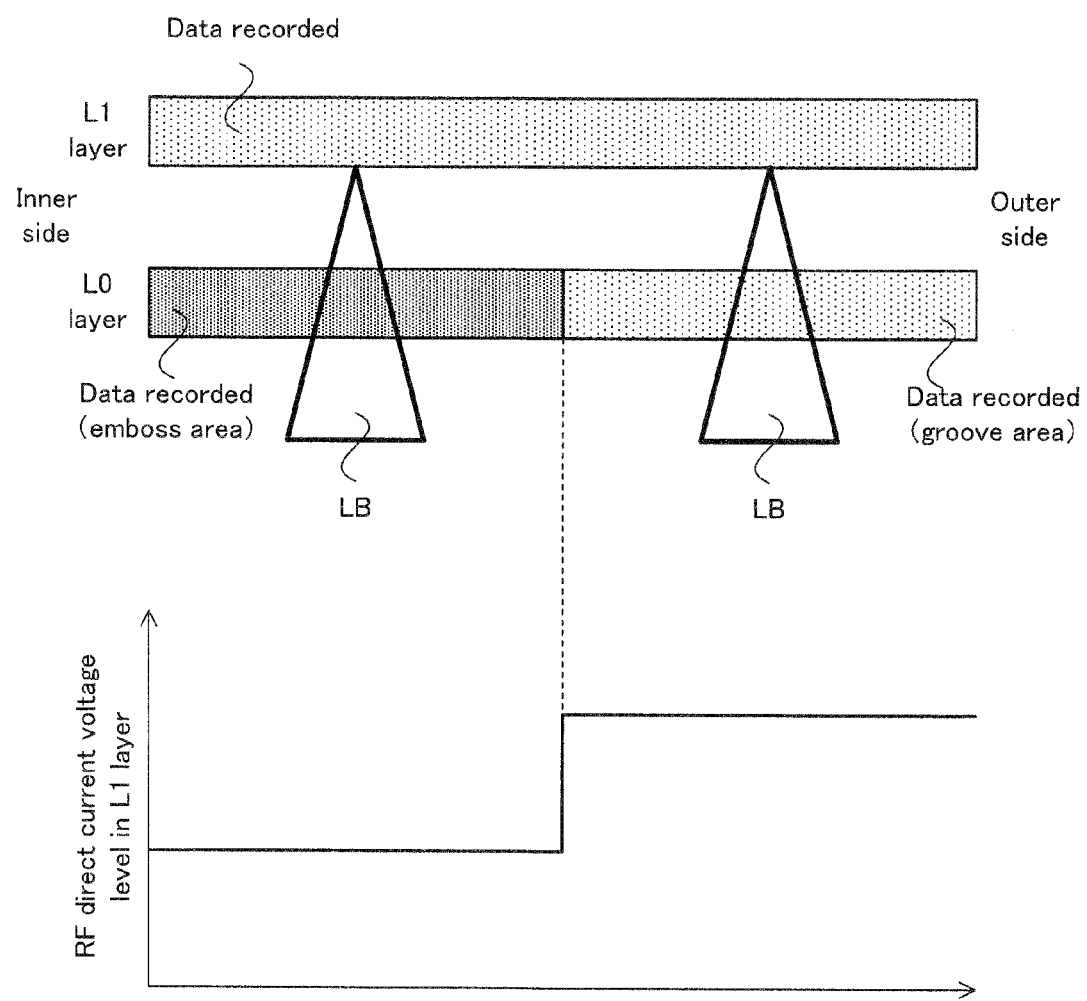

[FIG. 5]
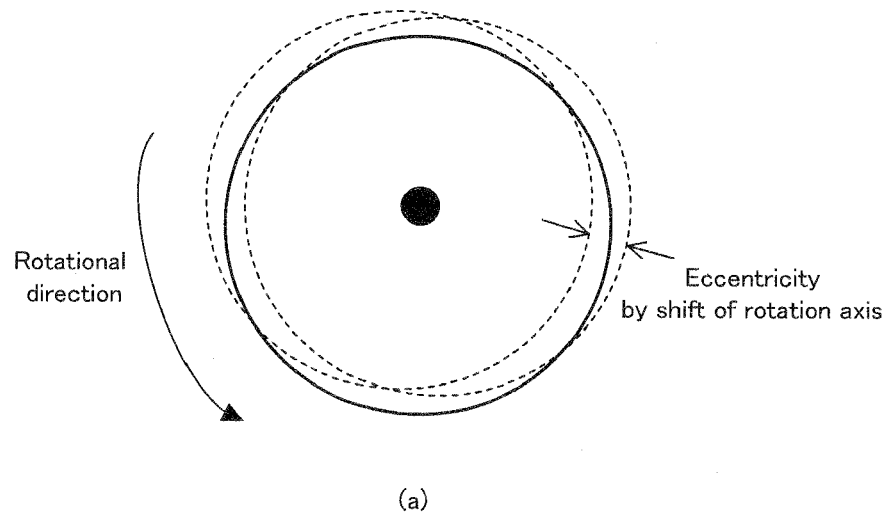
(a)
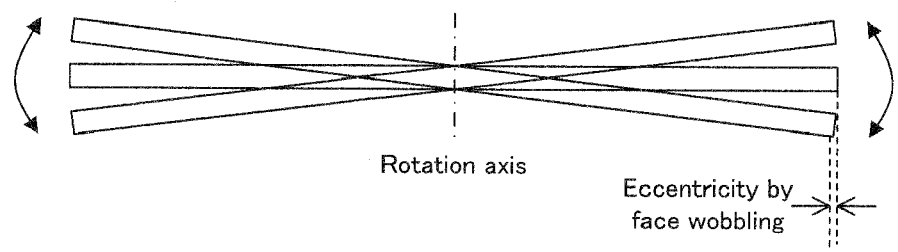
(b)
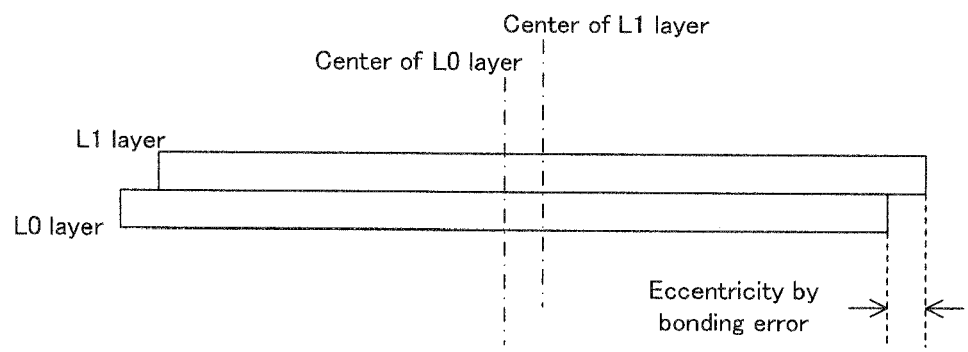
(c)

[FIG. 6]
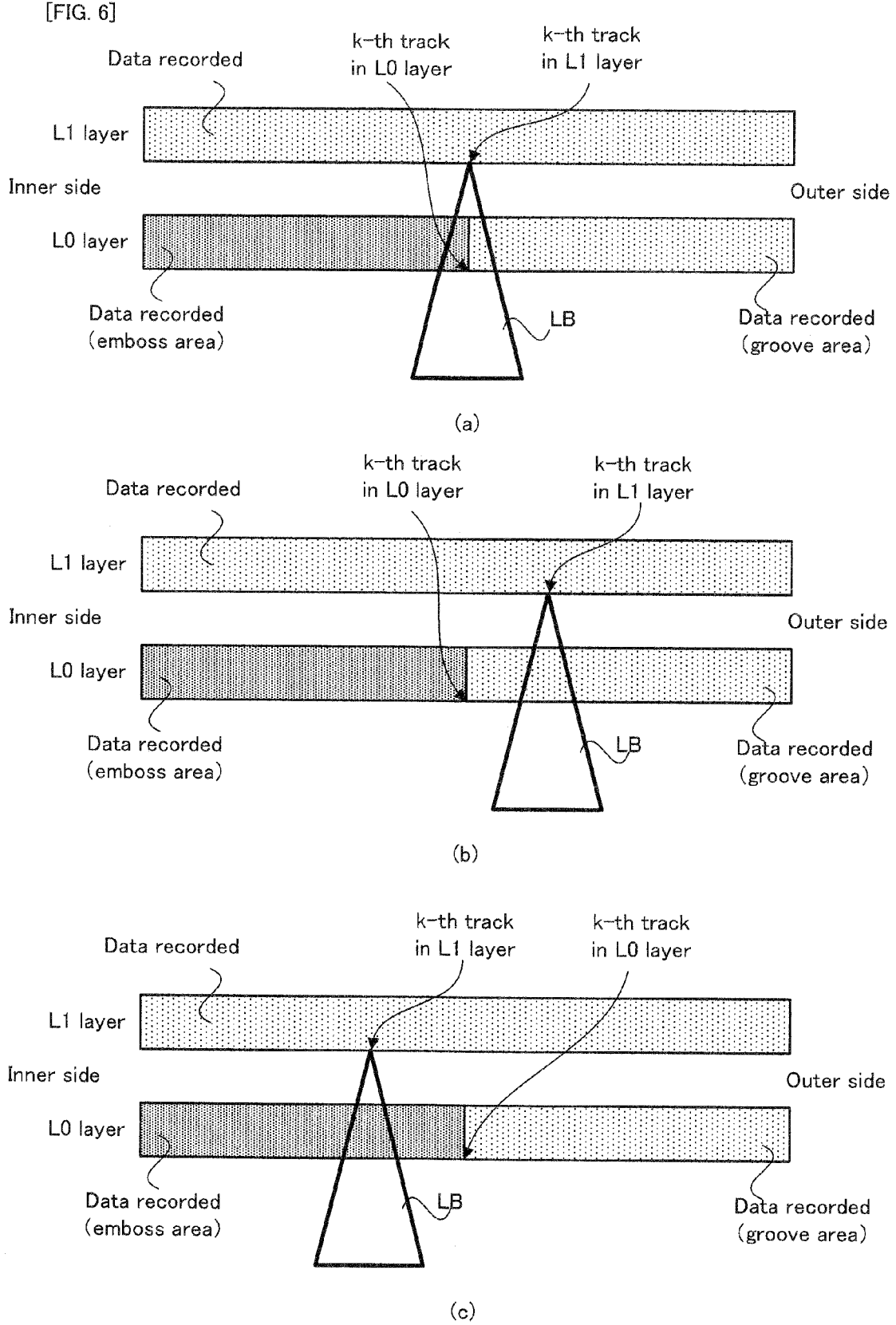

[FIG. 7]
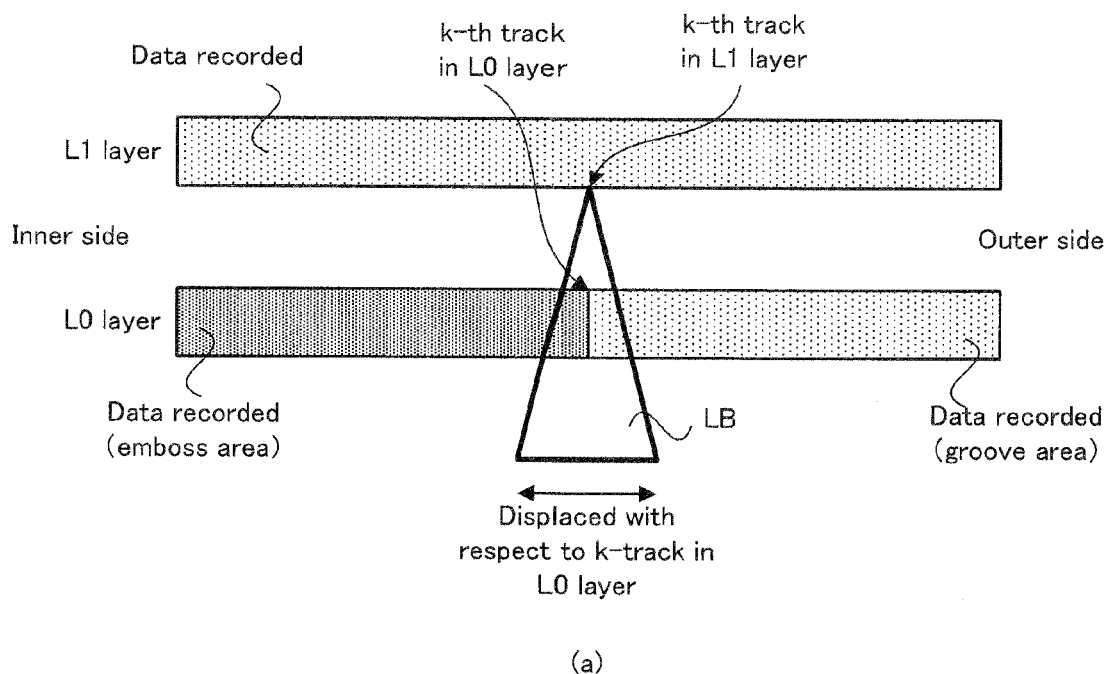
(a)
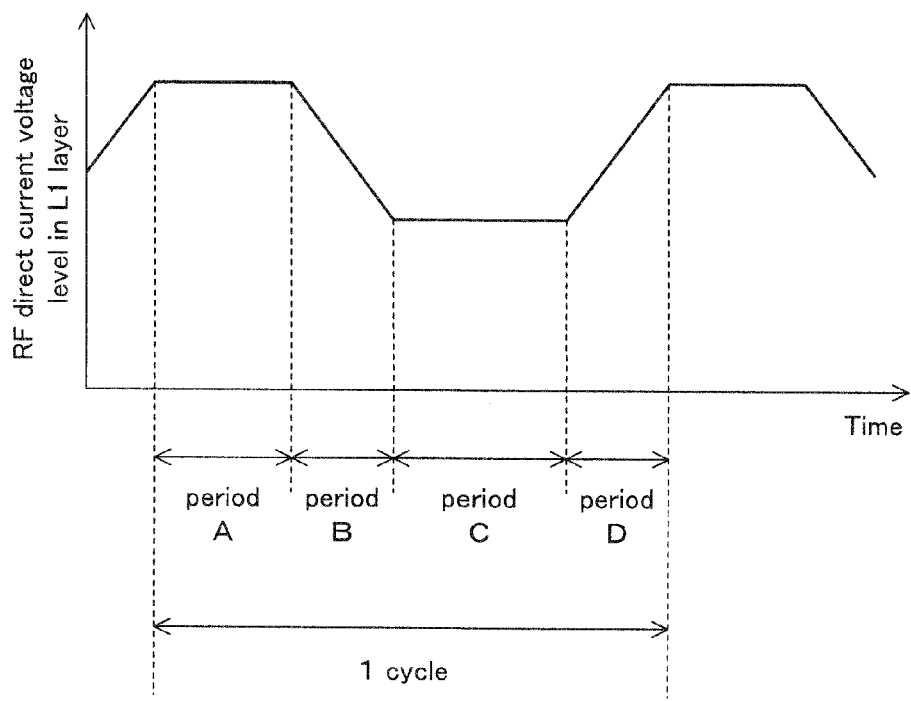
(b)

[FIG. 8]
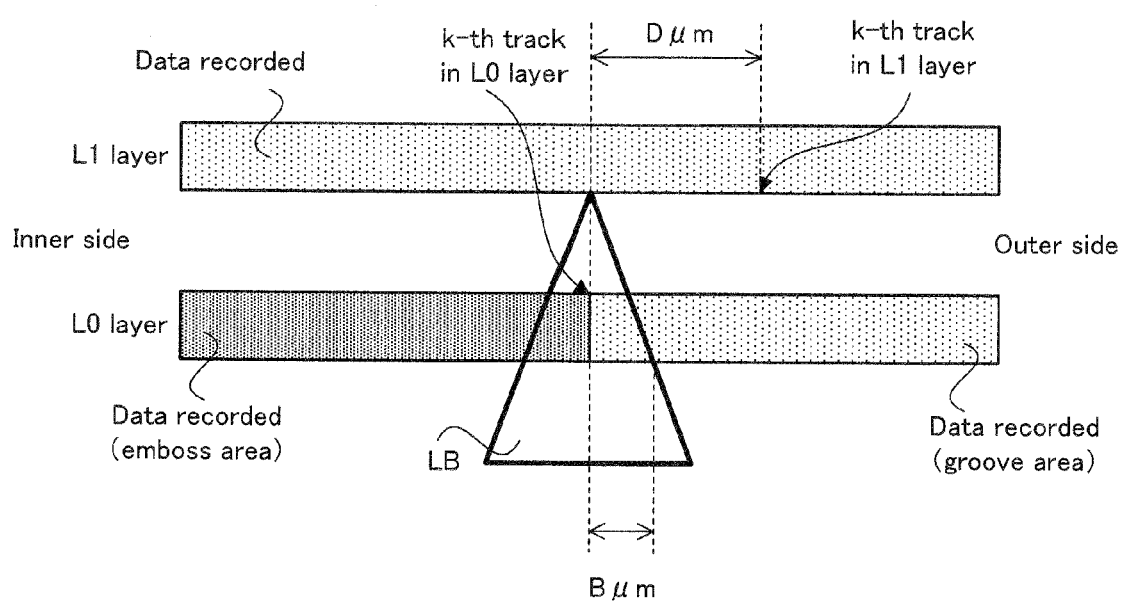

[FIG. 9]
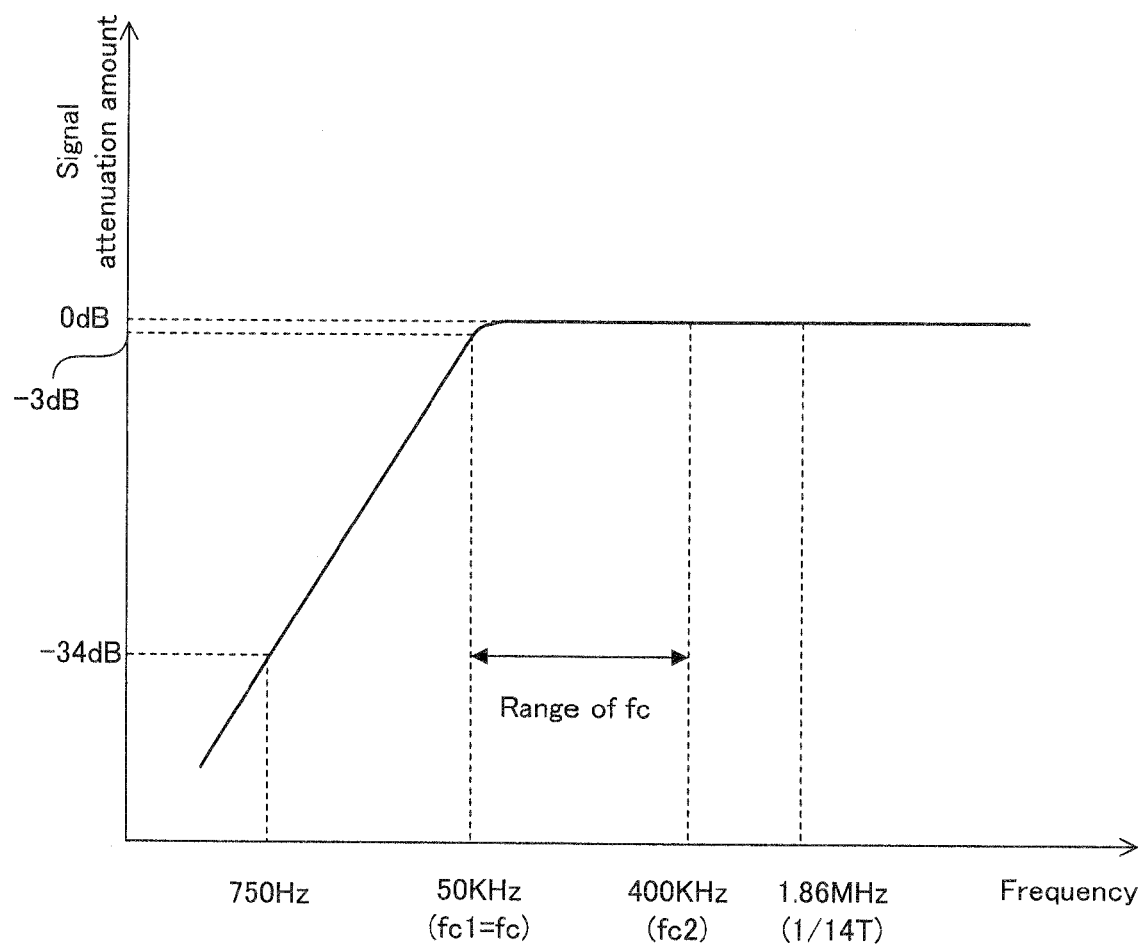

[FIG. 10]
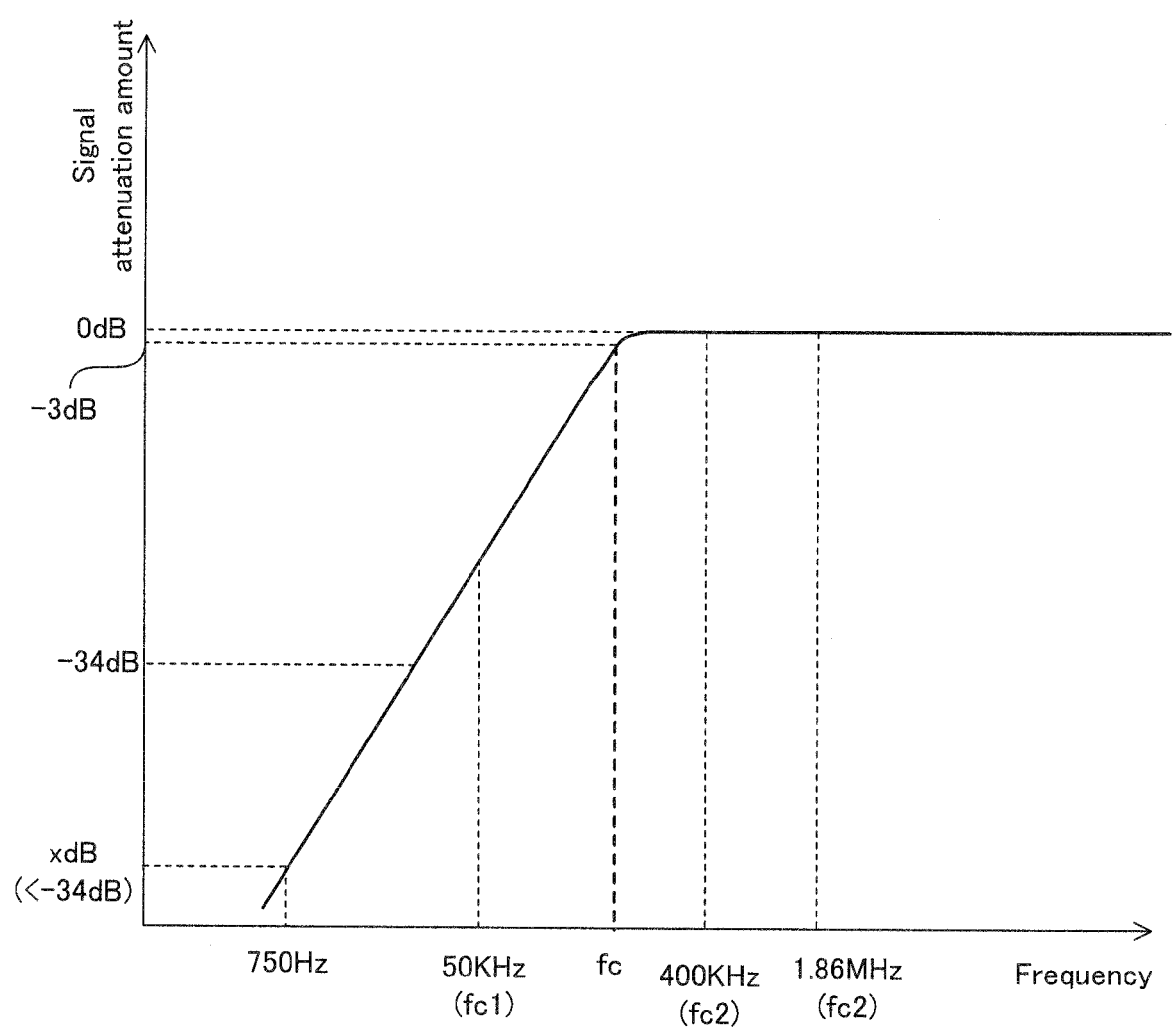

[FIG. 11]
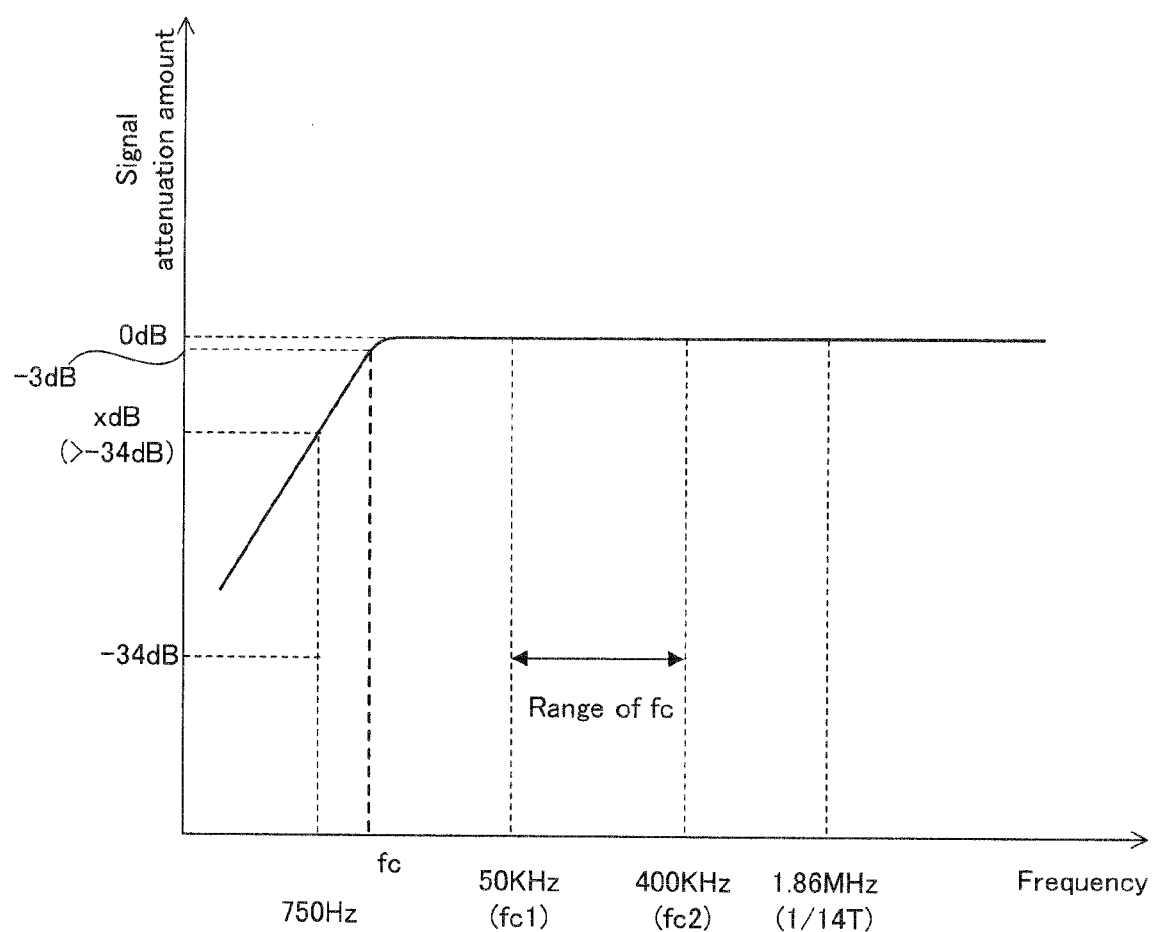

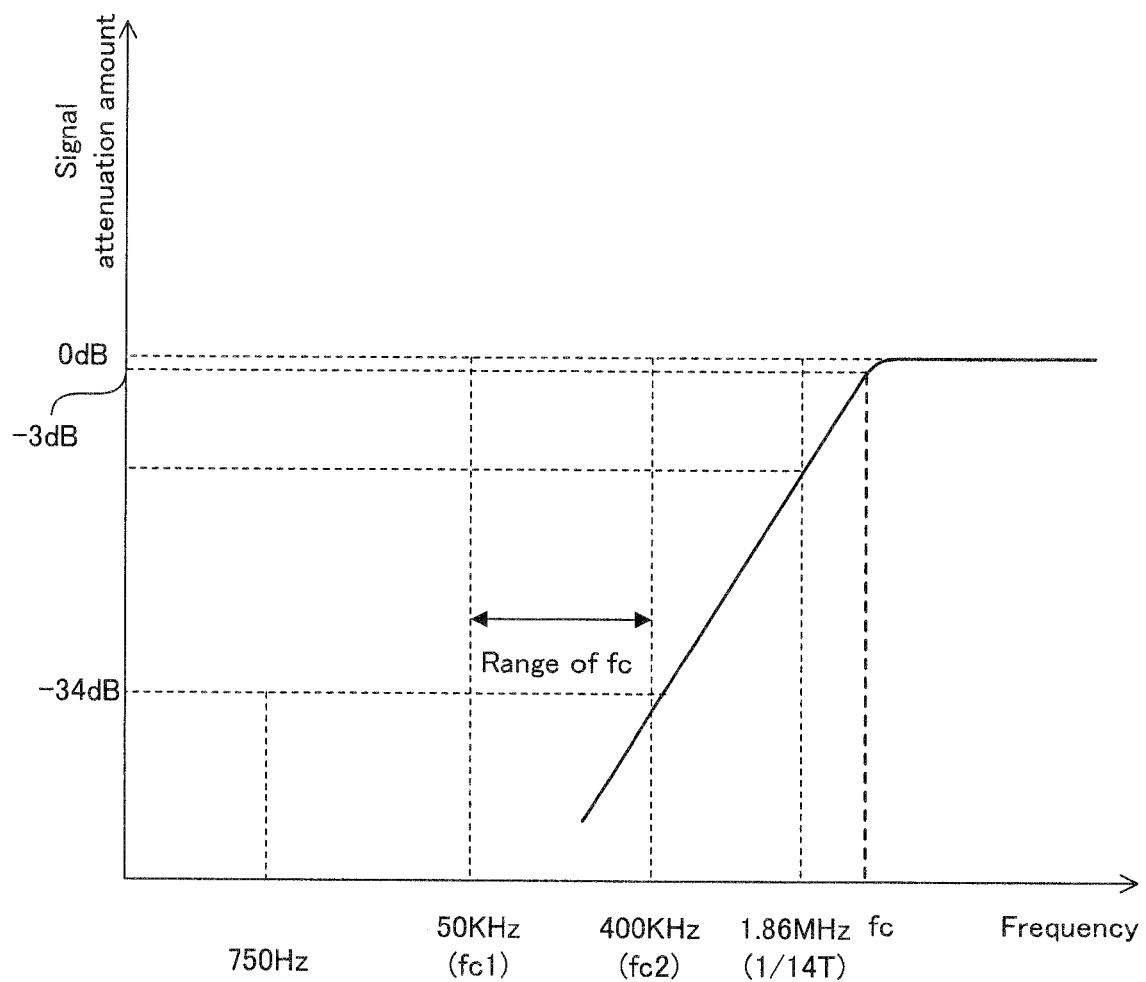
[FIG. 12]

[FIG. 13]
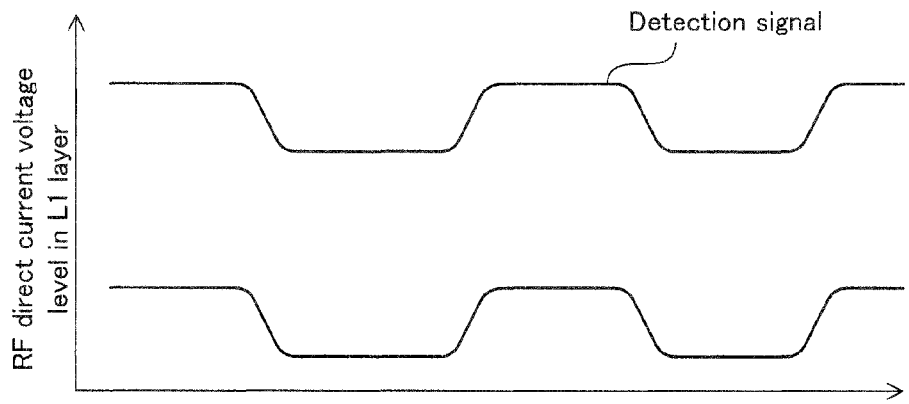
(a)
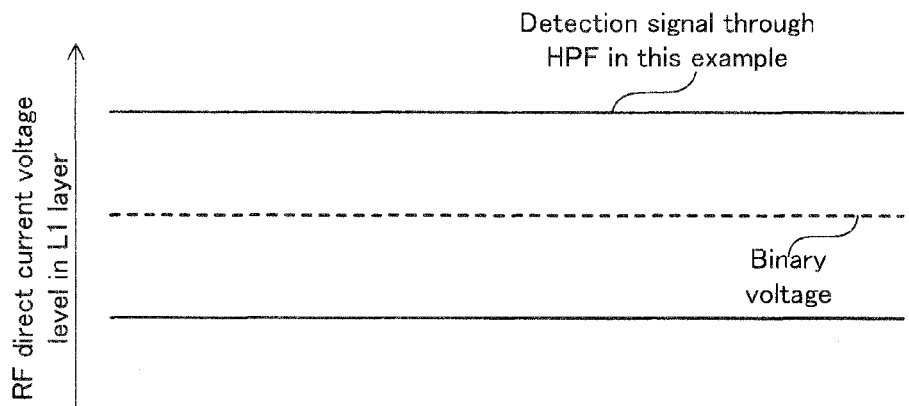
(b)
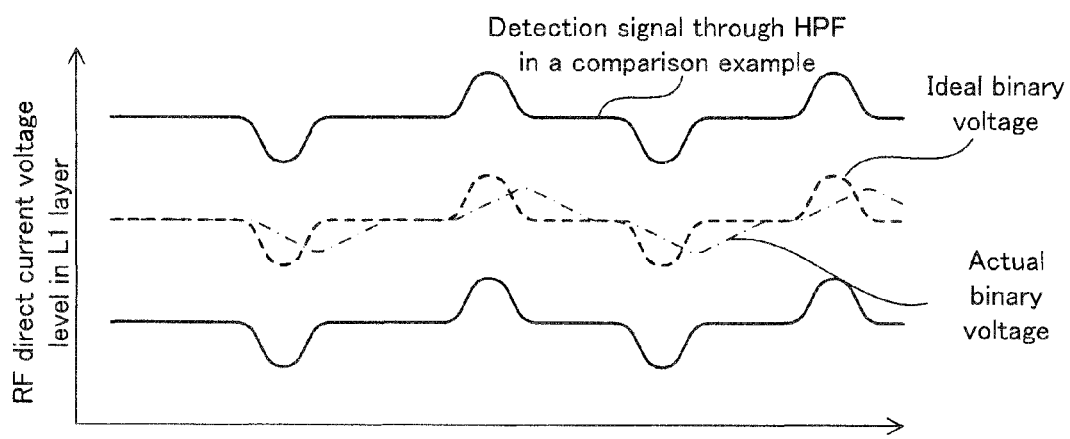
(c)

INFORMATION REPRODUCTION DEVICE

TECHNICAL FIELD

The present invention relates to an information reproducing apparatus for reproducing data recorded on an information recording medium, such as a DVD.

BACKGROUND ART

In an information recording medium, such as an optical disc, like a CD-ROM (Compact Disc-Read Only Memory), a CD-R (Compact Disc-Recordable) or the like, there is also developed a multilayer type optical disc or the like on which a plurality of recording layers are laminated on a same substrate. More specifically, a dual-layer type optical disc, which is one specific example of the multilayer type optical disc, has a first recording layer (referred to as a "L0 layer" as occasion demands in the application) located on the front side (i.e. on the closer side to an optical pickup) viewed from the irradiation side of laser light in the recording by an information recording apparatus, and has a semi-transmissive reflective film located on the rear thereof (i.e. on the farther side from the optical pickup). The dual-layer type optical disc also has a second recording layer (referred to as a "L1 layer" as occasion demands in the application) located on the rear side of the semi-transmissive reflective film through an intermediate layer, such as an adhesive layer, and has a reflective film located on the rear side thereof. In preparing such a dual-layer type information recording medium, the L0 layer and the L1 layer are formed separately, and the two layers are bonded in the end, by which the dual-layer type optical disc can be manufactured at low cost.

Then, an information recording apparatus, such as a CD recorder, which performs recording with respect to the dual layer type optical disc, focuses (or irradiates) laser light for recording on the L0 layer, to thereby record data into the L0 layer in an irreversible change recording method or in a rewritable method, and focuses the laser light on the L1 layer, to thereby record data into the L1 layer in the irreversible change recording method or in the rewritable method.

On the other hand, in reproducing the data recorded on the optical disc, in order to maintain the preferable data reproduction, it is necessary to eliminate a direct current potential difference (or DC level change) which is superimposed on a detection signal (i.e. RF signal) obtained by that the laser light irradiated from the optical pickup is reflected on a recording surface of the optical disc. Thus, a measure of binarizing the detection signal after eliminating the direct current potential difference of the detection signal with a high pass filter (refer to patent documents 1, 2, and 3), and a measure of binarizing after adding an offset to the slider level of a data slicer (refer to a patent document 4), and the like are developed. In these measures, the extent of the offset added to the slider level of the data slicer and the time constant (or cutoff frequency) of the high pass filter are determined depending on a defect caused on the surface of the optical disc by a scratch, fingerprints, or the like, or depending on a difference in recording features between a data unit and a header unit accompanying the data unit.

Patent document 1: Japanese Patent Application Laid Open NO. 2003-46373
Patent document 2: Japanese Patent Application Laid Open NO. 2002-123945
Patent document 3: Japanese Patent Application Laid Open NO. 2000-182239
Patent document 4: Japanese Patent Application Laid Open NO. 2002-319239

DISCLOSURE OF INVENTION

Subject to be Solved by the Invention

However, in the dual-layer type optical disc, an eccentricity between the L0 layer and the L1 layer often occurs. If such an eccentricity occurs, there is a possibility that an unexpected direct current potential difference is generated in the detection signal detected in reproducing the data in the L1 layer, depending on the recording state of the L0 layer. Specifically, if the L1 layer is irradiated with the laser light near the boundary between an emboss area portion in the L0 layer in which embossed pits are formed and a groove area portion in the L0 layer in which a record mark is formed, the light intensity of the laser light transmitted through the L0 layer varies because of the presence of the eccentricity. The reason is that the laser light is irradiated onto the L1 layer only through the emboss area portion in some cases, or onto the L1 layer only through the groove area portion in some cases, or onto the L1 layer through each of the emboss area portion and the groove area portion in some cases, because of the presence of the eccentricity. Thus, in reproducing the data recorded in the L1 layer, the direct current potential change occurs in the detection signal because of the change in the light intensity of the laser light transmitted through the L0 layer. This causes such a technical problem that it can be hard to preferably reproduce the data (in particular, to binarize the detection signal).

The above is listed as one example of the subject to be solved. More specifically, it is an object of the present invention to provide an information reproducing apparatus that can preferably reproduce data on a multilayer type optical disc.

Means for Solving the Subject

The above object of the present invention can be achieved by an information reproducing apparatus provided with: a detecting device for irradiating an information recording medium with laser light and detecting reflected light of the laser light as a detection signal, the information recording medium provided with: a first recording layer which is irradiated with the laser light to reproduce data; and a second recording layer which is irradiated with the laser light through the first recording layer to reproduce the data; a high pass filter for performing a filtering process on the detected detection signal; and a reproducing device for performing a reproduction process of the filtered detection signal to reproduce the data, the high pass filter attenuating a fluctuation component fluctuation component of the detection signal, caused by a relative eccentricity between the first recording layer and the second recording layer, by a first attenuation amount or more.

These effects and other advantages of the present invention will become more apparent from the embodiment explained below.

BRIEF DESCRIPTION OF DRAWINGS

FIG. 1 are a substantial plan view showing the basic structure of an optical disc having a plurality of recording areas, which is an information recording medium in an example, a cross sectional view showing the optical disc, and a schematic conceptual view showing a recording area structure in the radial direction and associated with the substantial plan view of the optical disc.

FIG. 2 is a block diagram conceptually showing the basic structure of an information reproducing apparatus in an example.

FIG. 3 is a circuit diagram conceptually showing the detailed circuit structures of a binary circuit and a high pass filter, provided for the information reproducing apparatus in the example.

FIG. 4 is a cross sectional view and a graph conceptually showing a relationship between the state of a L0 layer and the direct current voltage level of a detection signal obtained from reflected light of laser beam from a L1 layer.

FIG. 5 are a plan view and cross sectional views conceptually showing an eccentricity that can be owned by an optical disc in an example.

FIG. 6 are cross sectional views conceptually showing the irradiation position of the laser beam when there is the eccentricity.

FIG. 7 are a cross sectional view and a graph conceptually showing the relationship between the state of the L0 layer and the direct current voltage level of the detection signal obtained from the reflected light of the laser beam from the L1 layer, when there is the eccentricity.

FIG. 8 is a cross sectional view conceptually showing an aspect of irradiating the laser beam on the L1 layer.

FIG. 9 is one graph conceptually showing a range of a cutoff frequency fc and a filter feature of a high pass filter.

FIG. 10 is another graph conceptually showing the range of the cutoff frequency fc and the filter feature of the high pass filter.

FIG. 11 is another graph conceptually showing the range of the cutoff frequency fc and the filter feature of the high pass filter.

FIG. 12 is another graph conceptually showing the range of the cutoff frequency fc and the filter feature of the high pass filter.

FIG. 13 are waveform charts conceptually showing the detection signal and aspects of binarizing the detection signal.

DESCRIPTION OF REFERENCE CODES 1 information reproducing apparatus
11 optical pickup
12 preamplifier
13 equalizer
14 high pass filter
15 DSP
16 binary circuit
100 optical disc
fc cutoff frequency
fc1 upper limit of cutoff frequency
fc2 lower limit of cutoff frequency

BEST MODE FOR CARRYING OUT THE INVENTION

Hereinafter, an embodiment of the information reproducing apparatus of the present invention will be explained.

According to an information reproducing apparatus in an embodiment of the present invention, it is provided with: a detecting device for irradiating an information recording medium with laser light and detecting reflected light of the laser light as a detection signal, the information recording medium provided with: a first recording layer which is irradiated with the laser light to reproduce data; and a second recording layer which is irradiated with the laser light through the first recording layer to reproduce the data; a high pass filter for performing a filtering process on the detected detection signal; and a reproducing device for performing a reproduction process of the filtered detection signal to reproduce the data, the high pass filter attenuating a fluctuation component fluctuation component of the detection signal, caused by a relative eccentricity between the first recording layer and the second recording layer, by a first attenuation amount or more.

According to the information reproducing apparatus in the embodiment of the present invention, by the operation of the detecting device, such as e.g. an optical pickup described later, the laser light is irradiated onto the information recording medium, and the reflected light thereof is detected as the detection signal. More specifically, the first recording layer is irradiated with the laser light, and the reflected light thereof is detected as the detection signal which indicates the data recorded in the first recording layer. On the other hand, the second recording layer, located on the rear side (in other words, on the farther side) of the first recording layer viewed from the irradiation side of the laser light, is irradiated with the laser light through the first recording layer, and the reflected light thereof is detected as the detection signal which indicates the data recorded in the second recording layer. The detection signal detected by the detecting device is filtered by the operation of the high pass filter, such as a high pass filter. After that, the detection signal on which the filtering process is performed is reproduced (e.g. binarized, decoded, or the like) by the operation of the reproducing device, and is then outputted to external output equipment, such as a display and a speaker, and is reproduced as predetermined video images, audio, or the like.

In particular, in the embodiment, the high pass filter performs the filtering process on the detection signal so that the fluctuation component of the detection signal, caused by the relative eccentricity between the first recording layer and the second recording layer, are attenuated by the first attenuation amount or more. That is, even if the fluctuation component, caused by the relative eccentricity due to a bonding error or the like between the first recording layer and the second recording layer (in other words, a relative position shift between the first recording layer and the second recording layer), is superimposed on the detection signal, the fluctuation component is eliminated by the operation of the high pass filter. As a result, the detection signal with the fluctuation component eliminated (e.g. the detection signal of the data itself recorded on the information recording medium, or substantially the same signal as the detection signal of the data itself recorded on the information recording medium) is inputted to the reproducing device.

By this, it is possible to eliminate the fluctuation component of the detection signal caused by the relative eccentricity, from the detection signal. As a result, the detection signal can be preferably reproduced (e.g. binarized, or the like), so that it is possible to preferably reproduce the data recorded on the multilayer type information recording medium.

In one aspect of the information reproducing apparatus in the embodiment of the present invention, a cutoff frequency (or a lower limit of the cutoff frequency) of the high pass filter is defined on the basis of extent of each of the relative eccentricity and a spot radius of the laser light on the first recording layer when the laser light is focused on the second recording layer.

According to this aspect, the cutoff frequency of the high pass filter or the lower limit thereof is set on the basis of each of the extent of the relative eccentricity, which can be a factor to generate the fluctuation component, and the extent of the spot radius of the laser light, which can be a factor to generate the fluctuation component, on the first recording layer when the laser light is focused on the second recording layer. By this, the fluctuation component of the detection signal caused by the relative eccentricity can be eliminated from the detection signal, to thereby preferably reproduce the data recorded on the multilayer type information recording medium.

In an aspect of the information reproducing apparatus in which the cutoff frequency or the lower limit thereof is defined on the basis of the extent of each of the relative eccentricity and the spot radius, as described above, the lower limit of the cutoff frequency may be a frequency that can attenuate a signal component with a frequency expressed by $n/((2\times\pi\times R\times 2\times \sin^{-1}(B/D))/(V\times 360))$ by the first attenuation amount, wherein R is a radial position in which the laser light is irradiated, V is a linear velocity, D is the extent of the relative eccentricity, B is the spot radius, and a reproduction speed is an n-time speed. In other words, the cutoff frequency may be a frequency that can attenuate the signal component with the frequency expressed by $n/((2\times\pi\times R\times 2\times \sin^{-1}(B/D))/(V\times 360))$ by the first attenuation amount or more.

By virtue of such construction, it is possible to preferably eliminate the signal component with the frequency expressed by $n/((2\times\pi\times R\times 2\times \sin^{-1}(B/D))/(V\times 360))$, which is the fluctuation component. As a result, it is possible to preferably reproduce the data recorded on the multilayer type information recording medium.

In another aspect of the information reproducing apparatus in the embodiment of the present invention, a cutoff frequency (or a lower limit of the cutoff frequency) of the high pass filter is defined on the basis of extent of each of a maximum allowable amount of the relative eccentricity and a spot radius of the laser light on the first recording layer when the laser light is focused on the second recording layer.

According to this aspect, the cutoff frequency of the high pass filter is set on the basis of each of the extent of the maximum allowable amount of the relative eccentricity determined by the standard or the like and the extent of the spot radius, instead of the extent of the actual relative eccentricity. By this, the fluctuation component of the detection signal caused by the relative eccentricity can be eliminated from the detection signal, to thereby preferably reproduce the data recorded on the multilayer type information recording medium.

In an aspect of the information reproducing apparatus in which the cutoff frequency is defined on the basis of the extent of each of the maximum allowable amount of the relative eccentricity and the spot radius, as described above, the lower limit of the cutoff frequency may be a frequency that can attenuate a signal component with a frequency expressed by $n/((2\times\pi\times R\times 2\times \sin^{-1}(B/D))/(V\times 360))$ by the first attenuation amount, wherein R is a radial position in which the laser light is irradiated, V is a linear velocity, D is the extent of the maximum allowable amount of the relative eccentricity, B is the spot radius, and a reproduction speed is an n-time speed. In other words, the cutoff frequency may be a frequency that can attenuate the signal component with the frequency expressed by $n/((2\times\pi\times R\times 2\times \sin^{-1}(B/D))/(V\times 360))$ by the first attenuation amount or more.

By virtue of such construction, it is possible to preferably eliminate the signal component with the frequency expressed by $n/((2\times\pi\times R\times 2\times \sin^{-1}(B/D))/(V\times 360))$, which is the fluctuation component. As a result, it is possible to preferably reproduce the data recorded on the multilayer type information recording medium.

In another aspect of the information reproducing apparatus in the embodiment of the present invention, the high pass filter attenuates the fluctuation component by the first attenuation amount or more to allow the detection signal to be binarized.

According to this aspect, the fluctuation component is eliminated by the operation of the filtering device to the extent that the detection signal can be preferably binarized. Specifically, the fluctuation component is eliminated to the extent that a binary voltage used on a binary circuit as described later can follow the detection signal. By this, the fluctuation component of the detection signal caused by the relative eccentricity can be eliminated from the detection signal, to thereby preferably reproduce the data recorded on the multilayer type information recording medium.

In another aspect of the information reproducing apparatus in the embodiment of the present invention, the first attenuation amount is greater than or equal to 20 dB (more preferably 34 dB).

According to this aspect, the fluctuation component superimposed on the detection signal can be attenuated by 20 dB (more preferably 34 dB). Thus, the fluctuation component is eliminated so that the data recorded on the information recording medium is preferably reproduced (in other words, to the extent that it does not have an adverse effect on the reproduction of the data recorded on the information recording medium), or so that the detection signal is preferably binarized (in other words, to the extent that it does not have an adverse effect on the binarization of the data). By this, the fluctuation component of the detection signal caused by the relative eccentricity can be eliminated from the detection signal, to thereby preferably reproduce the data recorded on the multilayer type information recording medium.

In another aspect of the information reproducing apparatus in the embodiment of the present invention, the fluctuation component is a fluctuation component which is generated when the laser light is irradiated on the second recording layer corresponding to a vicinity of a boundary between an area portion with a first state in the first recording layer and an area portion with a second state, which is different from the first state, in the first recording layer.

According to this aspect, the fluctuation component can be eliminated from the detection signal, to thereby preferably reproduce the data recorded on the multilayer type information recording medium.

In another aspect of the information reproducing apparatus in the embodiment of the present invention, the high pass filter substantially maintains a signal level of the detection signal detected by irradiating the laser light on a longest pit (e.g. a pit related to a 14 T mark in case of a DVD, which is one specific example of the information recording medium), which is formed on the second recording layer to record the data.

According to this aspect, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

Incidentally, the expression that "substantially maintains the signal level of the detection signal" means in effect to maintain the signal level to the extent that the reproduction of the data included in the detection signal is not influenced.

In an aspect of the information reproducing apparatus which substantially maintains the signal level of the detection signal detected by irradiating the laser light on the longest pit, as described above, an upper limit of a cutoff frequency of the high pass filter may be a frequency that can substantially maintain the signal level of the detection signal detected by irradiating the laser light on the longest pit.

By virtue of such construction, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

In another aspect of the information reproducing apparatus in the embodiment of the present invention, the high pass filter substantially maintains a signal level of the detection signal detected by irradiating the laser light on a longest pit, which is formed on the second recording layer to record the data, at a reference reproduction speed (e.g. a reproduction speed of one-time speed).

According to this aspect, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

In an aspect of the information reproducing apparatus which substantially maintains the signal level of the detection signal detected by irradiating the laser light on the longest pit at the reference reproduction speed, as described above, an upper limit of a cutoff frequency of the high pass filter may be a frequency that can substantially maintain the signal level of the detection signal detected by irradiating the laser light on the longest pit at the reference reproduction speed.

By virtue of such construction, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

In another aspect of the information reproducing apparatus in the embodiment of the present invention, the high pass filter attenuates the detection signal detected by irradiating the laser light on a longest pit, which is formed on the second recording layer to record the data, only by less than a second attenuation amount, which is less than the first attenuation amount.

According to this aspect, the signal level of the detection signal of the data itself recorded on the information recording medium is attenuated only by at most the second attenuation amount. Therefore, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

In an aspect of the information reproducing apparatus which attenuates the detection signal of the longest pit by the second attenuation, as described above, an upper limit of a cutoff frequency of the high pass filter may be a frequency that attenuates the detection signal detected by irradiating the laser light on the longest pit by the second attenuation amount. In other words, the cutoff frequency may be the frequency that attenuates the detection signal detected by irradiating the laser light on the longest pit by less than the second attenuation amount.

By virtue of such construction, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

In another aspect of the information reproducing apparatus in the embodiment of the present invention, the high pass filter attenuates the detection signal detected by irradiating the laser light on a longest pit, which is formed on the second recording layer to record the data, at a reference reproduction speed only by less than a second attenuation amount, which is less than the first attenuation amount.

According to this aspect, the signal level of the detection signal of the data itself recorded on the information recording medium is attenuated only by at most the second attenuation amount. Therefore, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

In an aspect of the information reproducing apparatus which attenuates the detection signal of the longest pit at the reference reproduction speed by the second attenuation amount, as described above, an upper limit of a cutoff frequency of the high pass filter may be a frequency that attenuates the detection signal detected by irradiating the laser light on the longest pit at the reference reproduction speed by the second attenuation amount. In other words, the cutoff frequency may be the frequency that attenuates the detection signal detected by irradiating the laser light on the longest pit at the reference reproduction speed by less than the second attenuation amount.

By virtue of such construction, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

In another aspect of the information reproducing apparatus in the embodiment of the present invention, the second attenuation amount is about 0.2 dB.

By virtue of such construction, the signal level of the detection signal of the data itself recorded on the information recording medium is attenuated only by at most 0.2 dB. Therefore, the signal level of the detection signal of the data itself recorded on the information recording medium is rarely or hardly reduced even while eliminating the fluctuation component of the detection signal caused by the relative eccentricity. By this, it is possible to eliminate the fluctuation component of the detection signal caused by the relative eccentricity, and it is also possible to preferably reproduce the data recorded on the multilayer type information recording medium.

These effects and other advantages of the present invention will become more apparent from the example explained below.

As explained above, the information reproducing apparatus in the embodiment of the present invention is provided with the detecting device, the high pass filter, and the reproducing device. Therefore, it is possible to eliminate, from the detection signal, the fluctuation component of the detection signal caused by the relative eccentricity, to thereby preferably reproduce the data recorded on the multilayer type information recording medium.

EXAMPLE

Hereinafter, the preferred example of the information reproducing apparatus of the present invention will be discussed with reference to the drawings.

(1) Information Recording Medium

Firstly, with reference to FIG. 1, a description will be given on an information recording medium on which reproduction is performed by an example of the information reproducing apparatus of the present invention. FIG. 1(*a*) is a substantial plan view showing the basic structure of an optical disc having a plurality of recording areas, which is an information recording medium in an example, and FIG. 1(*b*) is a cross sectional view showing the optical disc, and a schematic conceptual view showing a recording area structure in the radial direction and associated with the substantial plan view of the optical disc.

As shown in FIG. 1(*a*) and FIG. 1(*b*), an optical disc 100 has a recording surface on a disc main body with a diameter of about 12 cm, as is a DVD. On the recording surface, the optical disc 100 is provided with: a center hole 101 as the center; a lead-in area 102; a data recording area 107; and a lead-out area 108 or a middle area 109, which are associated with this example. Then, for example, on a transparent substrate 200 of the optical disc 100, there are laminated recording layers. In each recording area of the recording layers, a track or tracks, such as groove tracks and land tracks, are alternately placed, spirally or concentrically, centered on the center hole 101. Moreover, on the track, data is divided and recorded by a unit of ECC block. The ECC block is a data management unit by which record information is error-correctable.

Incidentally, the present invention is not particularly limited to the optical disc having these three areas. For example, even if the lead-in area 102, the lead-out area 108 or the middle area 109 does not exist, a data structure explained below can be constructed. Moreover, as described later, the lead-in area 102, the lead-out area 108 or the middle area 109 may be further segmentized.

In particular, the optical disc 100 in the example, as shown in FIG. 1(*b*), has such a structure that a L0 layer and a L1 layer, which constitute one example of the "first and second record layers" of the present invention descried later, respectively, are laminated on the transparent substrate. Upon the recording/reproduction of such a dual-layer type optical disc 100, the recording/reproduction in the L0 layer or the L1 layer is performed, depending on which recording layer has the focus position of a laser beam LB, irradiated from the upper side to the lower side in FIG. 1(*b*).

Moreover, the optical disc 100 in the example is not limited to a two-layer single sided type, i.e., a dual layer type, but may be a two-layer double sided type, i.e., a dual layer double sided type. Furthermore, the optical disc 100 in the example is not limited to the optical disc having the two recording layers, as described above, but may be an optical disc of a multilayer type which has three or more layers.

(2) Basic Structure of Information Reproducing Apparatus

Next, with reference to FIG. 2, the basic structure of an information reproducing apparatus in an example will be explained. FIG. 2 is a block diagram conceptually showing the basic structure of the information reproducing apparatus in the example.

As shown in FIG. 2, an information reproducing apparatus 1 in the example is provided with: the optical disc 100; a spindle motor 10; an optical pickup (PU) 11; a preamplifier 12; an equalizer 13; a high pass filter (HPF) 14; and a DSP (Digital Signal Processor) 15.

The spindle motor 10 is adapted to rotate the optical disc 100 at a predetermined speed, under spindle servo from a not-illustrated servo circuit or the like, which is controlled by a spindle servo control signal outputted from the DSP 15.

The optical pickup 11 constitutes one specific example of the "detecting device" of the present invention. The optical pickup 11 is to reproduce the data recorded on the optical disc 100, and is provided with a semiconductor laser device, a photo detector, various lenses, an actuator, and the like. More specifically, the optical pickup 11 irradiates the optical disc 100 with the laser beam LB, detects the laser beam reflected by the recording surface of the optical disc 100, and generates a detection signal. The generated detection signal is outputted to the preamplifier 12.

The preamplifier 12 amplifies the detection signal outputted from the photo detector, which receives the reflected light of the laser beam LB irradiated from the optical pickup 11, and outputs the amplified signal. Specifically, the detection signal (i.e. RF signal) is outputted to the equalizer 13.

The equalizer 13 is adapted to perform predetermined signal processing (e.g. signal waveform shaping, or the like) on the detection signal outputted from the preamplifier 12 and to output the detection signal on which the signal processing is performed, to the high pass filter 14.

Incidentally, in addition to the signal processing by the equalizer 13, signal processing by ASP or gain control by AGC (Auto Gain Control) may be performed on the detection signal outputted from the preamplifier 12.

The high pass filter 14 performs a filtering process on the detection signal outputted from the equalizer 13 and eliminates a low-frequency signal component (or direct current signal component) included in the detection signal. The filtering process is performed in accordance with a cutoff frequency fc described later. The detection signal with the low-frequency signal component or the direct current signal component eliminated is outputted to the DSP 15.

The DSP 15 constitutes one specific example of the "reproducing device" of the present invention. The DSP 15 performs a process of binarizing the detection signal outputted form the high pass filter 14, to thereby generate a binary signal, and performs various signal processing (e.g. a decoding process, an error correction process, a demodulation process, and the like) on the binary signal, to thereby generate a reproduction signal including e.g. a video signal, an audio signal, and the like. The process of binarizing the detection signal is performed by the binary circuit 16 disposed in the DSP 15. The generated reproduction signal is outputted to external output equipment, such as a display and a speaker, and is reproduced as video images and audio.

Incidentally, the constituent elements shown in FIG. 2 selectively shows necessity minimum elements required to explain the example. Thus, obviously, it may be further provided with a constituent element or elements except the aforementioned constituent elements.

Next, with reference to FIG. 3, a description will be given on the more detailed structures of the high pass filter 14 and the binary circuit 16 provided for the information reproducing apparatus in the example. FIG. 3 is a circuit diagram conceptually showing the detailed circuit structures of the binary circuit 16 and the high pass filter 14, provided for the information reproducing apparatus in the example.

As shown in FIG. 3, the high pass filter 14 is provided with: a condenser 141; and an earthed resistance 142. The cutoff frequency fc of the high pass filter 14 is determined from a capacitance value C of the condenser 141 and a resistance value R of the resistance 142. Specifically, $fc=1/(2 \times \pi \times R \times C)$.

In the example, each of the capacitance value C of the condenser 141 and the resistance value R of the resistance 142 is set such that the cutoff frequency fc is in a range described later (refer to FIG. 8).

The binary circuit 16 includes: a comparator 161; an operational amplifier 162; a resistance 163; a resistance 164; and a condenser 165. The detection signal through the high pass filter 14 is inputted to a positive-phase input terminal of the comparator 161, and an output signal of the comparator 161 is inputted to a reversed-phase input terminal of the operational amplifier 163 through the resistance 162. A reference voltage Vref is applied to a positive-phase input terminal of the operational amplifier 163. An output signal of the operational amplifier 163 is fed back to a reversed-phase input terminal of the comparator 161, and is fed back to the reversed-phase input terminal of the operational amplifier 163 through the resistance 164 and the condenser 165. As a result, the binary signal obtained by binarizing the detection signal is outputted from the output terminal of the comparator 161 to a next processing circuit 151 provided with a decoder or the like.

The data recorded on the optical disc 100 is reproduced by the information reproducing apparatus in this structure. More specifically, in reproducing the data recorded in the L0 layer, focusing is performed to focus the laser beam LB on the L0 layer, and the detection signal of the laser beam LB reflected on the recording surface of the L0 layer is detected. On the other hand, in reproducing the data recorded in the L1 layer, focusing is performed to focus the laser beam LB on the L1 layer, and the detection signal of the laser beam LB reflected on the recording surface of the L1 layer is detected.

At this time, in reproducing the data recorded in the L1 layer, it is necessary to irradiate the laser beam LB through the L0 layer. Thus, depending on the state of the L0 layer through which the laser beam LB is transmitted, the light intensity (or power) of the laser beam LB on the L1 layer is changed in some cases. Such a change in the light intensity of the laser beam LB on the L1 layer will be explained with reference to FIG. 4. FIG. 4 is a cross sectional view and a graph conceptually showing a relationship between the state of the L0 layer and the direct current voltage level of the detection signal obtained from reflected light of laser beam from the L1 layer.

As shown in an upper part of FIG. 4, it is assumed that the L0 layer has an emboss area in which physical embossed pits are formed and a groove area (i.e. a recorded groove area) in which a groove track and a land track are formed and in which a record mark is formed on the groove track (or land track) due to the irradiation of the laser beam LB or the like. In this case, the transmittance of the emboss area with respect to the laser beam LB is less than that of the recorded groove area with respect to the laser beam LB. Thus, if the L1 layer is irradiated with the laser beam LB with a certain power, the light intensity on the L1 layer of the laser beam LB irradiated through the emboss area is different from that on the L1 layer of the laser beam LB irradiated through the groove area. More specifically, the light intensity on the L1 layer of the laser beam LB irradiated through the emboss area is weaker than that on the L1 layer of the laser beam LB irradiated through the groove area.

Thus, as shown in a lower part of FIG. 4, if the L1 layer is irradiated with the laser beam LB with the certain power, the direct current voltage level of the detection signal obtained by detecting the reflected light of the laser beam LB irradiated on the L1 layer through the emboss area of the L0 layer is different from that of the detection signal obtained by detecting the reflected light of the laser beam LB irradiated on the L1 layer through the groove area of the L0 layer. More specifically, the direct current voltage level of the detection signal obtained by detecting the reflected light of the laser beam LB irradiated on the L1 layer through the emboss area of the L0 layer is less than that of the detection signal obtained by detecting the reflected light of the laser beam LB irradiated on the L1 layer through the groove area of the L0 layer.

By the way, the dual-layer type optical disc 100 having the L0 layer and the L1 layer often has an eccentricity. Now, with reference to FIG. 5, a description will be given on specific examples of the eccentricity that can be owned by the optical disc 100 in the example. FIG. 5 are a plan view and cross sectional views conceptually showing the eccentricity that can be owned by the optical disc 100 in the example.

As shown in FIG. 5(a), if the center of the disc-shaped optical disc 100 does not match the rotation center axis of the optical disc 100, an eccentricity occurs due to a shift or deviation of the rotation center axis. If the optical disc shown in a thick black line in FIG. 5(a) is rotated around the rotation center axis shown by a black circle, the optical disc 100 exists in a position shown in a dashed line, depending on time. In this case, even if trying to search for a predetermined track on the optical disc 100, on the basis of a distance from the rotation center axis, the optical pickup 352 cannot preferably search for it, due to the eccentricity caused by the shift of the center rotation axis. That is, the laser beam LB irradiated from the optical pickup 11, which is located at the same distance from the center rotation axis, is irradiated onto the optical disc 100 over a plurality of tracks. The number of the tracks (or the length of the tracks in the radial direction) irradiated with the laser beam LB corresponds to the eccentricity here.

Moreover, as shown in FIG. 5(b), an eccentricity caused by surface-wobbling occurs on the optical disc 100. Specifically, this eccentricity occurs due to the warping of the optical disc 100, specifically, in the outer circumferential portion. Therefore, in the case where there is the surface-wobbling (i.e. the recording surface of the optical disc 100 does not cross vertically to the center rotation axis) and in the case where there is not the surface-wobbling (i.e. the surface of the optical disc 100 crosses vertically to the center rotation axis), the laser beam LB irradiated from the optical pickup 11, which is located at the same distance from the center rotation axis, is irradiated onto different tracks (or positions with different physical addresses). This difference in positions irradiated with the laser beam between the case where there is the surface-wobbling and the case where there is not the surface-wobbling, corresponds to the eccentricity here.

Moreover, as shown in FIG. 5(c), an eccentricity caused by a bonding error or the like occurs, in the multilayer type optical disc. This eccentricity will be explained by taking the dual-layer type optical disc as an example. The dual-layer type optical disc is produced by bonding the first recording layer (L0 layer) and the second recording layer (L1 layer). At this time, if the center of the L0 layer and the center of the L1 layer do not match with respect to the center rotation axis, the recording positions (or recording areas) in the both recording layers, indicated by the same address (or the same track), do not match, as viewed from the optical pickup 11. This shift or difference of the recording positions that do not match, corresponds to the eccentricity here.

In particular, in the optical disc 100 in the example having the two recording layers, there is such a technical problem that the generation of the eccentricity shown in FIG. 5(c) may have an adverse influence on the data reproduction. Now, with reference to FIG. 6 and FIG. 7, a description will be given on the problem at the time of data reproduction when there is the eccentricity. FIG. 6 are cross sectional views conceptually showing the irradiation position of the laser beam LB when there is the eccentricity. FIG. 7 are a cross sectional view and a graph conceptually showing the relationship between the state of the L0 layer and the direct current voltage level of the detection signal obtained from the reflected light of the laser beam from the L1 layer, when there is the eccentricity.

As shown in FIG. 6(a), the k-th track of the L0 layer and the k-th track of the L1 layer are originally in the same position viewed from the irradiation side of the laser beam LB if there is no eccentricity. However, if there is the eccentricity, the k-th track of the L0 layer and the k-th track of the L1 layer may be in different positions viewed from the irradiation side of the laser beam LB.

For example, as shown in FIG. 6(b), the k-th track of the L1 layer sometimes exists on the outer circumferential side of the k-th track of the L0 layer. In this case, the laser beam LB is irradiated onto the k-th track of the L1 layer through the groove area of the L0 layer.

Alternatively, as shown in FIG. 6(c), the k-th track of the L1 layer sometimes exists on the inner circumferential side of the k-th track of the L0 layer. In this case, the laser beam LB is irradiated onto the k-th track of the L1 layer through the emboss area of the L0 layer.

As described above, in reproducing the data recorded on the k-th track of the L1 layer of the optical disc 100 with the eccentricity occurring, the laser beam LB transits from a state shown in FIG. 6(b) to a state shown in FIG. 6(c). That is, on the basis of the L1 layer, the laser beam LB is always irradiated onto the k-th track, whereas on the basis of the L0 layer, the laser beam LB is irradiated while transiting between the k+Δk1 track located on the outer circumferential side and the k−Δk2 track located on the inner circumferential side, as occasion demands.

Then, as shown in FIG. 7(a), if there is the boundary between the emboss area and the groove area near the k-th track of the L0 layer, the transit of the irradiation position of the laser beam LB on the L0 layer changes the direct current voltage level of the detection signal obtained from the reflected light of the laser beam LB from the L1 layer, as shown in FIG. 7(b). As shown in FIG. 7(b), in a period A, the laser beam LB is irradiated onto the k-th track of the L1 layer only through the emboss area of the L0 layer (the state shown in FIG. 6(c)). In a period B, the laser beam LB is irradiated onto the k-th track of the L1 layer through each of the emboss area and the groove area of the L0 layer (the state in transit from the state shown in FIG. 6(c) to the state shown in FIG. 6(b)). In a period C, the laser beam LB is irradiated onto the k-th track of the L1 layer through the groove area of the L0 layer (the state shown in FIG. 6(b)). In a period D, the laser beam LB is irradiated onto the k-th track of the L1 layer through each of the emboss area and the groove area of the L0 layer (the state in transit from the state shown in FIG. 6(b) to the state shown in FIG. 6(c)). Passing through the period A to the period D indicates seeking one cycle of the k-th track of the L1 layer.

The detection signal with the direct current voltage level changing is hard to be binarized preferably or ideally, on the binary circuit 16. As a result, it is hard to preferably reproduce the data recorded on the optical disc 100. Thus, in the example, the cutoff frequency fc of the high pass filter 14 is set in the following range, to thereby eliminate the change in the direct current voltage level and realize the preferable binarization of the detection signal and the preferable reproduction of the data. Hereinafter, the cutoff frequency fc of the high pass filter 14 will be explained.

Incidentally, the range of the cutoff frequency fc is preferably set in view of the overall eccentricity of the optical disc 100 as a whole, including the eccentricity caused by the shift of the rotation center axis shown in FIG. 5(a), the eccentricity caused by the surface-wobbling shown in FIG. 5(b), and the eccentricity the eccentricity caused by the bonding error shown in FIG. 5(c). in the following, if the "eccentricity" is merely described, it may mean the overall eccentricity of the optical disc 100 as a whole, including the eccentricity caused by the shift of the rotation center axis shown in FIG. 5(a) and the eccentricity caused by the face wobbling shown in FIG. 5(b), in addition to or instead of the eccentricity the eccentricity caused by the bonding error shown in FIG. 5(c).

(3) Cutoff Frequency of High Pass Filter

Next, with reference to FIG. 8 to FIG. 11, the cutoff frequency fc of the high pass filter 14 will be explained. FIG. 8 is a cross sectional view conceptually showing an aspect of irradiating the laser beam LB on the L1 layer. FIG. 9 is one graph conceptually showing a range of the cutoff frequency fc and a filter feature of the high pass filter 14. FIG. 10 is another graph conceptually showing the range of the cutoff frequency fc and the filter feature of the high pass filter 14. FIG. 11 is another graph conceptually showing the range of the cutoff frequency fc and the filter feature of the high pass filter 14. FIG. 12 is another graph conceptually showing the range of the cutoff frequency fc and the filter feature of the high pass filter 14. FIG. 13 are waveform charts conceptually showing the detection signal and aspects of binarizing the detection signal.

As shown in FIG. 8, it is assumed that the maximum value of the eccentricity of the optical disc 100 is D[μm], the spot radius of the laser beam LB on the L0 layer if the L1 layer is irradiated with the laser beam LB is B[μm], the radial position of the boundary portion between the emboss area and the groove area is R[mm], and a linear velocity is V[mm/s]. At this time, a constant θ is defined as $\theta = \sin^{-1}(B/D)$.

In this case, a time length Tr required to seek one cycle of the track that exists in the position of the radius R is $Tr = (2 \times \pi \times R)/V$. Therefore, a transit time Tm required for the spot of the laser beam LB on the L0 layer to be displaced over the boundary portion between the emboss area and the groove area (i.e. a transit time Tm corresponding to the sum of the period B and the period D) is $Tm = (Tr \times 2 \times \theta)/360$. At this time, if a reproduction speed is a n-time speed with respect to a one-time speed, which is a reference speed, the frequency of the change in the direct current voltage level is expressed by n/Tm.

Therefore, the cutoff frequency fc of the high pass filter 14 is a frequency which attenuates a signal component with a frequency of n/Tm sufficiently (in other words, to the extent that the preferable data reproduction can be maintained or so that the detection signal can be preferably binarized). For example, the cutoff frequency fc is preferably a frequency which attenuates the signal component with the frequency of n/Tm by 20 dB or more. More preferably, the cutoff frequency fc is preferably a frequency which attenuates the signal component with the frequency of n/Tm by 34 dB or more. At this time, a lower limit fc1 of the cutoff frequency is a frequency which attenuates the signal component with the frequency of n/Tm by 20 dB or more, more specifically by 34 dB or more. Of course, the numerical values of "34 dB" and "20 dB" are one specific example, and any attenuation amount, which can attenuate the signal to the extent that the preferable data reproduction can be maintained or so that the detection signal can be preferably binarized, can be used.

On the other hand, it is necessary to prevent the detection signal of the data itself recorded on the optical disc 100 from being attenuated because of the high pass filter 14. A signal component with the lowest frequency among the detection signal of the data itself recorded on the optical disc 100 is a signal obtained by reproducing a longest pit (e.g. a 14 T pattern pit in case of a DVD, which is one specific example of the optical disc 100) at a reproduction speed of one-time speed. Therefore, the cutoff frequency fc of the high pass filter 14 is preferably a frequency that rarely or hardly attenuates the detection signal obtained by reproducing the longest pit. That is, the cutoff frequency fc of the high pass filter 14 needs to be less than 1/14 T. In other words, an upper limit fc2 of the cutoff frequency fc of the high pass filter 14 needs to be less than 1/14 T.

This will be explained using specific numerical values. In a DVD-R DL (Dual Layer), which is one specific example of the optical disc 100, a relative eccentricity is determined by the standard to be less than or equal to 100[μmp-p]. Therefore, the maximum value D of the relative eccentricity is 50[μm0-p]. Moreover, if the laser beam LB determined by the standard is irradiated onto the optical disc 100 determined by the standard, the spot radius B on the L0 layer is substantially 15[μm]. Therefore, the transit time Tm in reproducing the data at the reproduction speed of one-time speed is substantially 8[μm]. Moreover, a speed at the maximum number of rotations, determined by mechanical limits in the existing DVD-R DL, is about 6 times on the innermost circumferential side of the optical disc 100.

Thus, the cutoff frequency fc of the high pass filter 14 is preferably a frequency that attenuates the signal component with a frequency of $6/(8 \times 10^{-3})=750$ Hz by 34 dB or more. In order to satisfy the requirement, for example, the cutoff frequency fc of the high pass filter 14 is preferably greater than or equal to 50 KHz. In other words, the lower limit fc1 of the cutoff frequency fc of the high pass filter 14 is preferably 50 KHz.

Moreover, the cutoff frequency fc of the high pass filter 14 is preferably a frequency that attenuates the signal component with a frequency of $6/(8 \times 10^{-3})=750$ Hz by at least 20 dB or more. In order to satisfy the requirement, for example, the cutoff frequency fc of the high pass filter 14 is preferably greater than or equal to 8 KHz. In other words, the lower limit fc1 of the cutoff frequency fc of the high pass filter 14 is preferably 8 KHz.

Incidentally, the following explanation describes the case that the lower limit fc1 of the cutoff frequency fc of the high pass filter 14 is set to 50 KHz; however, if the lower limit fc1 of the cutoff frequency fc of the high pass filter 14 is greater than or equal to 8 KHz, obviously it is possible to receive the same effects as those in the case that it is set to 50 KHz.

On the other hand, in a DVD-R DL (Dual Layer), which is one specific example of the optical disc 100, 1/14 T=1.86 MHz. Therefore, the cutoff frequency fc of the high pass filter 14 needs to be less than 1.86 MHz. For example, the cutoff frequency fc of the high pass filter 14 is preferably 400 KHz (=0.4 MHz). In other words, the upper limit fc2 of the cutoff frequency fc of the high pass filter 14 is preferably 400 KHz. Setting the cutoff frequency fc to a value that is less than or equal to 400 KHz makes the detection signal component, obtained by reproducing the longest pit, being attenuated by at most 0.2 dB.

For example, FIG. 9 shows the filter feature of the high pass filter 14 with a cutoff frequency fc of 50 KHz. As shown in FIG. 9, if the cutoff frequency fc is 50 KHz, it allows the signal component with 50 KHz to be attenuated by 3 dB and it allows the change in the direct current voltage level that changes at a frequency of 750 Hz (i.e. the change in the direct current voltage level caused by the eccentricity) to be attenuated by 34 dB. Moreover, it allows the signal component of the detection signal, obtained by reproducing the longest pit, to be attenuated by at most 0.2 dB.

Moreover, the filter feature of the high pass filter 14 with a cutoff frequency fc of 8 KHz is the same as a graph which is obtained by displacing the graph of a characteristic diagram shown in FIG. 9 in parallel to the left. Even in this case, it allows the signal component with 8 KHz to be attenuated by 3 dB and it allows the change in the direct current voltage level that changes at the frequency of 750 Hz (i.e. the change in the direct current voltage level caused by the eccentricity) to be attenuated by 20 dB. Moreover, it allows the signal component of the detection signal, obtained by reproducing the longest pit, to be attenuated by at most 0.2 dB.

Incidentally, the cutoff frequency fc only needs to be in a range of fc1 to fc2. Thus, it can be set not only as fc=50 KHz but also to any value between 50 KHz and 200 KHz (or between 8 KHz and 200 KHz), as shown in FIG. 10. If the cutoff frequency fc of the high pass filter 14 is set to a value in this range, that allows the change in the direct current voltage level that changes at the frequency of 750 Hz (i.e. the change in the direct current voltage level caused by the eccentricity) to be attenuated by 34 dB or more (or 20 dB or more), and it allows the signal component of the detection signal, obtained by reproducing the longest pit, to be attenuated by at most 0.2 dB.

On the other hand, if the cutoff frequency fc is not in the range of fc1 to fc2, it is hard or impossible to eliminate the change in the direct current voltage level caused by the eccentricity. Alternatively, the detection signal of the data itself recorded on the optical disc 100 is attenuated.

For example, as shown in FIG. 11, if the cutoff frequency fc is less than the lower limit fc1, the change in the direct current voltage level caused by the eccentricity cannot be attenuated by 34 dB or more (or 20 dB or more). That is, it is hard to eliminate the change in the direct current voltage level caused by the eccentricity. Thus, the cutoff frequency fc needs to be a frequency that allows the signal component with the frequency of n/Tm to be attenuated sufficiently (e.g. the lower limit fc1 or less).

On the other hand, as shown in FIG. 12, if the cutoff frequency fc is greater than the upper limit fc2, the detection signal obtained by reproducing the longest pit is attenuated excessively. That is, it is hard to reproduce the data itself recorded on the optical disc 100. Thus, the cutoff frequency fc needs to be a frequency that allows the detection signal obtained by reproducing the longest pit to be attenuated to the extent that the reproduction is not influenced (e.g. the upper limit fc2 or less).

As described above, by setting the cutoff frequency fc of the high pass filter 14 between fc1 and fc2, if the detection signal with a fluctuation component in which the direct current voltage level changes due to the eccentricity as shown in FIG. 13(a) is inputted to the high pass filter 14 the detection signal with the fluctuation component eliminated as shown in a thick line in FIG. 13(b) is outputted to the binary circuit 16. As a result, it is possible to obtain a binary signal by using an ideal binary voltage shown in a dashed line in FIG. 13(b).

On the other hand, in an information reproducing apparatus in a comparison example in which the cutoff frequency fc of the high pass filter 14 is not set (e.g. an information reproducing apparatus having a high pass filter with the cutoff frequency of about 1 KHz determined by the standard) unlike the information reproducing apparatus in the example, the detection signal including a fluctuation component shown in FIG. 13(c) is outputted from the high pass filter 14 to the binary circuit 16. As a result, on the binary circuit 16, it is necessary to binarize the detection signal by using an ideal binary voltage shown in a dashed line in FIG. 13(c). However, it is hardly possible to follow the binary voltage of the binary circuit 16 together with the detection signal at high speed. Thus, the detection signal is actually binarized with a binary voltage shown in an alternate long and short dash line in FIG. 13(c). This does not allow the preferable binarization.

According to the example, however, as shown in FIG. 13(b), it is possible to preferably binarize the detection signal with the fluctuation component caused by the eccentricity eliminated, using the ideal binary voltage.

As explained above, according to the information reproducing apparatus 1 in the example, it is possible to preferably eliminate, from the detection signal, the change in the direct current voltage level generated in the detection signal due to the relative eccentricity between the L0 layer and the L1 layer. As a result, the detection signal can be preferably reproduced (e.g. binarized or the like), so that the data recorded on the multilayer type optical disc 100 can be preferably reproduced.

Incidentally, the cutoff frequency fc of the high pass filter 14 may be set in advance in manufacturing the information reproducing apparatus 1, or it may be adjusted or changed in recording the data onto the optical disc 100.

Moreover, in the aforementioned example, the maximum value of an allowable amount accepted by the standard is used as the extent of the eccentricity in view of convenience in obtaining the cutoff frequency fc. However, obviously, the range of the cutoff frequency fc may be set by using the actual extent of the eccentricity of the optical disc 100.

Moreover, in the aforementioned example, a description was given on the case that the L1 layer is irradiated with the laser beam LB through the boundary portion between the emboss area and the groove area; however, the same is true even if the L1 layer is irradiated with the laser beam through the boundary portion between the groove area in which the data is recorded and the groove area in which the data is unrecorded. Even in this case, the groove area in which the data is recorded and the groove area in which the data is unrecorded have different transmittance with respect to the laser beam LB. Thus, by setting the cutoff frequency fc of the high pass filter 14 as described above, the aforementioned benefits can be received. The point is that if the L1 layer is irradiated with the laser beam through the boundary portion between a first state and a second state in which the transmittance is different from each other, the aforementioned benefits can be received by setting the cutoff frequency fc of the high pass filter 14 as described above.

Moreover, in the aforementioned example, the dual-layer type optical disc 100 is explained; however, obviously the same is true for an optical disc having three or more recording layers.

Moreover, in the aforementioned example, the optical disc 100 is explained as one example of the information recording medium, and a player related to the optical disc 100 is explained as one example of the information reproducing apparatus. The present invention, however, is not limited to the optical disc and the player thereof, and can be also applied to other various information recording media which support high density recording or high transmission rate and to the players thereof.

The present invention is not limited to the aforementioned example, and various changes may be made, if desired, without departing from the essence or spirit of the invention which can be read from the claims and the entire specification. An information reproducing apparatus, which involves such changes, is also intended to be within the technical scope of the present invention.

INDUSTRIAL APPLICABILITY

The information reproducing apparatus of the present invention can be applied to an information reproducing apparatus, such as a DVD player. Moreover, it can be applied to an information recording apparatus or the like which is mounted on various computer equipment for consumer use or for commercial use, or which can be connected to various computer equipment.

The invention claimed is:

1. An information reproducing apparatus comprising:
a detecting device for irradiating an information recording medium with laser light and detecting reflected light of the laser light as a detection signal, the information recording medium comprising: a first recording layer which is irradiated with the laser light to reproduce data; and a second recording layer which is irradiated with the laser light through the first recording layer to reproduce the data;
a high pass filter for performing a filtering process on the detected detection signal; and
a reproducing device for performing a reproduction process of the filtered detection signal to reproduce the data,
said high pass filter attenuating a fluctuation component of the detection signal, caused by a relative eccentricity between the first recording layer and the second recording layer, by at least a first attenuation amount.

2. The information reproducing apparatus according to claim 1, wherein a lower limit of a cutoff frequency of said high pass filter is defined on the basis of extent of each of the relative eccentricity and a spot radius of the laser light on the first recording layer when the laser light is focused on the second recording layer.

3. The information reproducing apparatus according to claim 2, wherein the lower limit of the cutoff frequency is a frequency that can attenuate a signal component with a frequency expressed by $n/((2 \times \pi \times R \times 2 \times \sin^{-1}(B/D))/(V \times 360))$ by the first attenuation amount, wherein R is a radial position in which the laser light is irradiated, V is a linear velocity, D is the extent of the relative eccentricity, B is the spot radius, and a reproduction speed is an n-time speed.

4. The information reproducing apparatus according to claim 1, wherein a lower limit of a cutoff frequency of said high pass filter is defined on the basis of extent of each of a maximum allowable amount of the relative eccentricity and a spot radius of the laser light on the first recording layer when the laser light is focused on the second recording layer.

5. The information reproducing apparatus according to claim 4, wherein the lower limit of the cutoff frequency is a frequency that can attenuate a signal component with a frequency expressed by $n/((2 \times \pi \times R \times 2 \times \sin^{-1}(B/D))/(V \times 360))$ by the first attenuation amount, wherein R is a radial position in which the laser light is irradiated, V is a linear velocity, D is the extent of the maximum allowable amount of the relative eccentricity, B is the spot radius, and a reproduction speed is an n-time speed.

6. The information reproducing apparatus according to claim 1, wherein said high pass filter attenuates the fluctuation component by the first attenuation amount or more to allow the detection signal to be binarized.

7. The information reproducing apparatus according to claim 1, wherein the first attenuation amount is greater than or equal to 20 dB.

8. The information reproducing apparatus according to claim 1, wherein the fluctuation component is a fluctuation component which is generated when the laser light is irradiated on the second recording layer corresponding to a vicinity of a boundary between an area portion with a first state in the first recording layer and an area portion with a second state, which is different from the first state, in the first recording layer.

9. The information reproducing apparatus according to claim 1, wherein said high pass filter substantially maintains a signal level of the detection signal detected by irradiating the laser light on a longest pit, which is formed on the second recording layer to record the data.

10. The information reproducing apparatus according to claim 9, wherein an upper limit of a cutoff frequency of said high pass filter is a frequency that can substantially maintain the signal level of the detection signal detected by irradiating the laser light on the longest pit.

11. The information reproducing apparatus according to claim 1, wherein said high pass filter substantially maintains a signal level of the detection signal detected by irradiating the laser light on a longest pit, which is formed on the second recording layer to record the data, at a reference reproduction speed.

12. The information reproducing apparatus according to claim 11, wherein an upper limit of a cutoff frequency of said high pass filter is a frequency that can substantially maintain the signal level of the detection signal detected by irradiating the laser light on the longest pit at the reference reproduction speed.

13. The information reproducing apparatus according to claim 1, wherein said high pass filter attenuates the detection signal detected by irradiating the laser light on a longest pit, which is formed on the second recording layer to record the data, only by less than a second attenuation amount, which is less than the first attenuation amount.

14. The information reproducing apparatus according to claim 13, wherein an upper limit of a cutoff frequency of said high pass filter is a frequency that attenuates the detection signal detected by irradiating the laser light on the longest pit by the second attenuation amount.

15. The information reproducing apparatus according to claim 1, wherein said high pass filter attenuates the detection signal detected by irradiating the laser light on a longest pit, which is formed on the second recording layer to record the data, at a reference reproduction speed only by less than a second attenuation amount, which is less than the first attenuation amount.

16. The information reproducing apparatus according to claim 15, wherein an upper limit of a cutoff frequency of said high pass filter is a frequency that attenuates the detection signal detected by irradiating the laser light on the longest pit at the reference reproduction speed by the second attenuation amount.

17. The information reproducing apparatus according to claim 13, wherein the second attenuation amount is about 0.2 dB.

* * * * *